April 28, 1964   J. W. WINFREY   3,131,385
AUTOMATIC FLUID FLOW REMOTE INDICATING SYSTEM
Filed Dec. 30, 1960   2 Sheets-Sheet 1
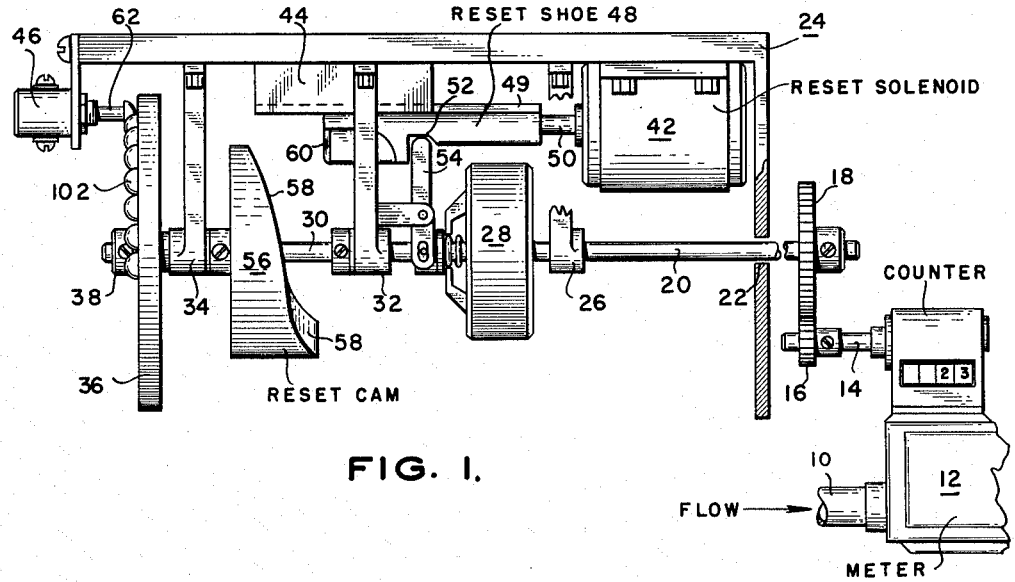
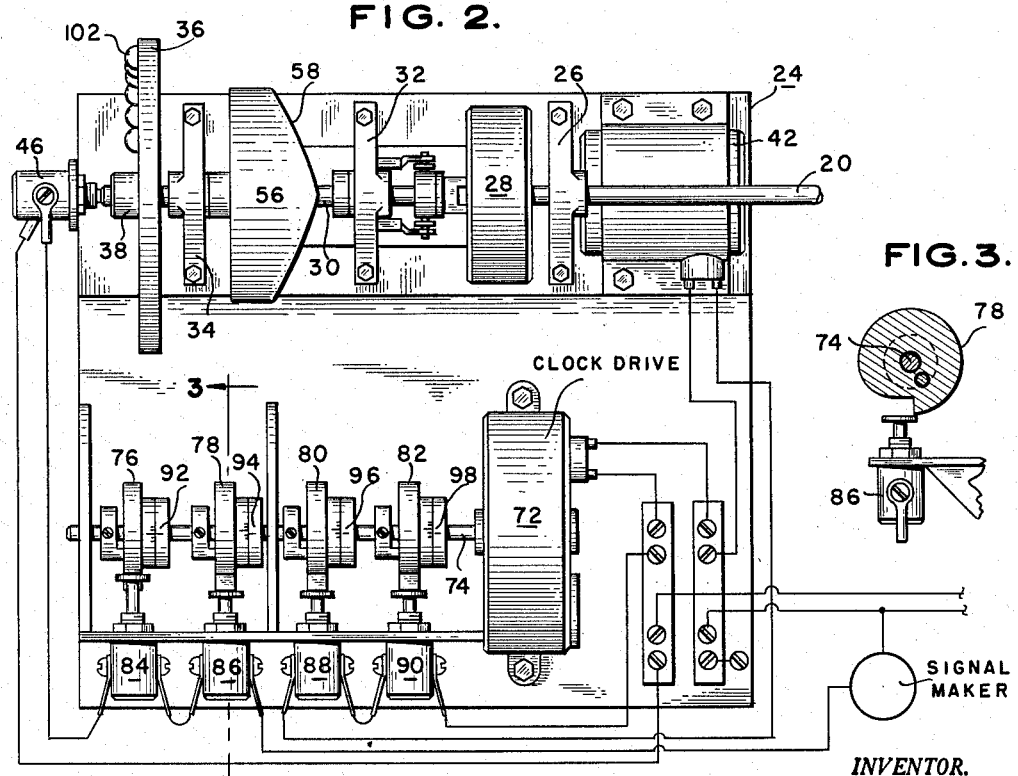
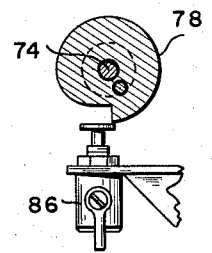
INVENTOR.
JAMES W. WINFREY,
BY *Frank S. Troidl*
ATTORNEY.

April 28, 1964   J. W. WINFREY   3,131,385
AUTOMATIC FLUID FLOW REMOTE INDICATING SYSTEM
Filed Dec. 30, 1960   2 Sheets-Sheet 2
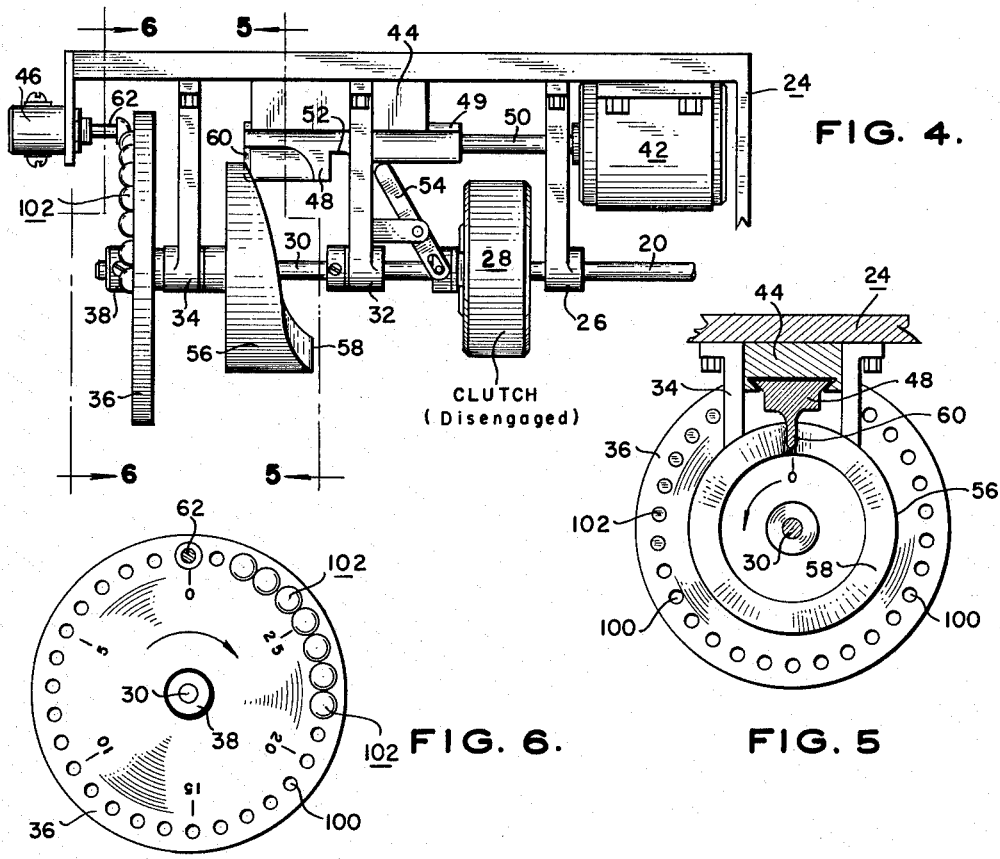
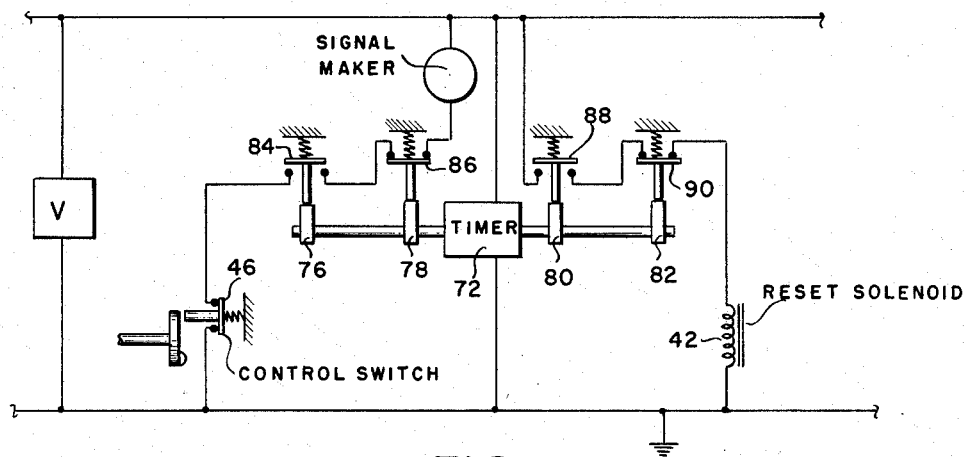
FIG. 7.
INVENTOR.
JAMES W. WINFREY,
BY Frank S. Troidl
ATTORNEY

United States Patent Office 3,131,385
Patented Apr. 28, 1964

3,131,385
AUTOMATIC FLUID FLOW REMOTE
INDICATING SYSTEM
James W. Winfrey, Houston, Tex., assignor, by mesne
assignments, to Jersey Production Research Company,
Tulsa, Okla., a corporation of Delaware
Filed Dec. 30, 1960, Ser. No. 79,693
4 Claims. (Cl. 340—239)

This invention is a remote indicating system for indicating whether or not a liquid producing facility is producing at a rate within predetermined limits over a predetermined period.

It is economically desirable to be able to leave oil field producing facilities unattended for extended lengths of time, which may be from a few hours to several days. In the past, this has usually been accomplished by producing the wells into storage tanks large enough to hold several days' production even if the lease is inadvertently overproduced. However, in some locations, as for example, offshore, large tankage is not feasible and fluid production is measured with some type of meter rather than in a tank, and thus the fluid is flowed or pumped away from the producing facility. After the wells are adjusted to the correct producing rate, the attendant (pumper) would not have to stay at the producing facility continuously if he could be informed periodically that the producing rate was continuing within a predetermined tolerance of the prescribed rate. This invention is a device to produce a signal if the average rate over a predetermined period, as measured by any type of meter, varies by more than the allowed tolerance.

Briefly described, this invention includes a liquid measuring device for measuring the amount of liquid produced. A mechanical power transmission system is connected to the liquid measuring device. A mechanical control member is also connected to the transmission system. The mechanical control member is moved an amount proportional to the amount of liquid measured by the measuring device. After the end of the predetermined time period, if the amount of liquid produced is not within the tolerance limits, means are provided for feeding a signal to a remotely located signal indicator.

The invention as well as its many advantages will be further understood by reference to the following detailed description and drawings in which:

FIG. 1 is a top view of a preferred embodiment of the invention;

FIG. 2 is a front elevational view of the preferred system;

FIG. 3 is a view taken along line 3—3 of FIG. 2;

FIG. 4 is a view similar to FIG. 1 but showing the reset shoe and reset cam during the resetting of the system;

FIG. 5 is a view taken along the line 5—5 of FIG. 4;

FIG. 6 is a view taken along line 6—6 of FIG. 4; and

FIG. 7 is a schematic diagram useful in explaining the operation of the system.

Referring to FIG. 1, a pipeline 10 is shown through which a liquid, such as oil, is to be flowed. A meter 12 is mounted on the pipeline 10 for indicating on a counter or other means connected to the meter the amount of liquid flowed through the pipeline 10 over a predetermined time period. A shaft 14 extends outwardly from the counter of meter 12. The shaft has mounted thereon a gear 16 which meshes with a larger gear 18. Gear 18 is mounted upon a shaft 20 which extends through an opening 22 in support 24.

Shaft 20 extends through a bearing 26 to a clutch mechanism 28. Shaft 30, coaxial with shaft 20, extends from the clutch mechanism 28 through bearings 32 and 34. A mechanical control member 36 is attached to the end of shaft 30 by a nut 38.

Connected to support 24 are a solenoid 42, a reset shoe guide member 44, and a control switch 46. A reset shoe 48 is connected to the solenoid shaft 50. The reset shoe 48 is provided with dovetails 49 which slide within dovetail ways formed in the reset shoe guide 44 when the solenoid 42 is actuated or deactuated. The reset shoe 48 has a cutout portion 52 adapted to control the operation of a clutch actuating handle 54.

Coaxially mounted upon the shaft 30 and adjacent the bearing 34 is a reset cam 56. The face 58 of the cam 56 is shaped such that when the system is automatically reset, the resetting operation is performed by movement of the edge 60 of the reset shoe 48 along the face 58 of the reset cam 56.

The control switch 46 has a contact 62 which is spring biased against the outer face of the rotatable disk control member 36.

Referring to FIG. 2, it can be seen that a timing mechanism is mounted on support 24 below the power transmission system. The timing mechanism includes an electrically powered clock 72. A clock operated shaft 74 extends from the clock 72. Mounted about the shaft 74 are longitudinally spaced-apart cams 76, 78, 80, and 82. Cams 76, 78, 80, and 82 control the actuation and deactuation of time switches 84, 86, 88, and 90, respectively.

As long as the contacts connected to each of the switches 84 through 90 ride on the larger radius portions of the cams 76 through 82, the spring biased switches 84 through 90 are in a normal position. However, as the cams 76 through 82 are rotated by the clock 72, when the vertical face of the cam is adjacent the switch contact, the position of the switch is reversed. This is more clearly seen in FIG. 3. The relative times at which the switches are reversed are controlled and indicated by indices 92, 94, 96, and 98 adjacent cams 76, 78, 80, and 82, respectively.

In operation, let it be assumed that the allowable liquid flow through the pipeline 10 is, say, 25 barrels per day with a tolerance of ±3 barrels per day. Thus, if more than 28 or less than 22 barrels flows through the pipeline 10, it is desired to actuate a remote signal device to indicate to the pumper that the amount of oil flowing through the pipeline 10 is outside of the tolerance limits. As shown in FIG. 6, the disk 36 is provided with a plurality of circumferentially arranged holes 100. These holes 100 are adapted to receive buttons or contacts 102. In the assumed case, where the tolerance is ±3 barrels per day, the buttons 102 are placed in holes numbered 22 through 28. The gear ratio of gears 16 and 18 is such that as one barrel of oil flows past the meter 12, the disk 36 is moved one hole clockwise, looking at FIG. 6. Thus, if between 22 and 28 barrels of oil have flowed through the pipeline 10 at the end of the predetermined time, say 24 hours, the contact 62 of switch 46 will be spring biased against one of the buttons 102.

The electrical control system consists of the control switch 46 and the four spring biased time switches 84, 86, 88, and 90. Control switch 46 is in series with time switch 84 and time switch 86. Thus, the control switch 46 and time switches 84 and 86 are in series with the remotely located signal maker (see FIG. 7). The object is to actuate the signal maker if collective production is outside the predetermined limits. Control switch 46 and time switch 84 are spring closed, and when time switch 84 drops off the shoulder of cam 76, time switch 84 is closed. This is set to occur once every 24 hours. If control switch 46 is not in contact with any of the buttons 102, control switch 46 is also closed and since time switch 86 is still in the closed position, the signal maker is actuated. The cam 78 actuating switch 86 is positioned with respect to the cam 76 actuating switch 84 so that switch 86 is opened after a predetermined period, usually a few seconds.

Time switches 88 and 90 control the solenoid 42 which actuated the reset shoe 48. Time switch 88 is closed shortly after time switch 86 is opened. Since time switch 90 is also closed at this time, the solenoid 42 is actuated to move the reset shoe 48 against the face 58 of the reset cam 56. Since the reset shoe 48 cannot rotate, it slides on the cam face 58 and rotates the cam 56 until it has reached the lowermost portion on the cam face, which corresponds to the starting position for the control disk 36. Actuation of the reset shoe 48 also disengages the clutch 28 so that rotation of the cam 56 and disk 36 will not cause the driving mechanism from the meter 12 to rotate.

Shortly after the system has been reset, cam 82 opens time switch 90 to break the solenoid circuit and the unit is in position to go through a new cycle.

Various changes can be made in this new system without departing from the scope of the invention. For example, resistor or electron tube type time relays could be substituted for the cams and time switches shown in the figures. Also, this particular arrangement may be converted to a pneumatically operated system by replacing the electrical switches with pneumatic valves and the solenoid actuator with a diaphragm or piston type actuator.

I claim:

1. An automatic remote indicating system for indicating when a liquid producing facility is producing at a rate outside of predetermined limits over a predetermined time period comprising: a liquid measuring device for measuring the amount of liquid produced; a mechanical control member; a mechanical power transmission system interconnecting the liquid measuring device and the mechanical control member for moving the mechanical control member an amount proportional to the amount of liquid measured by the measuring device; a remotely located indicator; signal conducting means connected to the remotely located indicator; a conduction control member in the signal conducting means which is normally positioned to prevent the conduction of a signal through the conducting means; a timing mechanism set to change the position of the conduction control member at the end of the predetermined time period to permit the conduction of a signal through the conducting means; means on the mechanical control member for causing a signal to be conducted to the remotely located indicator if the amount of liquid produced is outside of the predetermined limits; and means for automatically resetting the system.

2. An automatic remote indicating system in accordance with claim 1 wherein the signal conducting means is an electrical current conducting system and the conduction control member is an electric switch.

3. An automatic remote indicating system for indicating when a liquid producing facility is producing at a rate outside of predetermined limits over a predetermined time period comprising: a liquid measuring device for measuring the amount of liquid produced; a rotatable control member; a mechanical power transmission system interconnecting the liquid measuring device and the rotatable control member for rotating the rotatable control member through an arc proportional to the amount of liquid measured by the measuring device; a remotely located indicator; signal conducting means connected to the remotely located indicator; a conduction control member in the signal conducting means which is normally positioned to prevent the conduction of a signal through the conducting means; a timing mechanism set to change the position of the conduction control member at the end of the predetermined time period to permit the conduction of a signal through the conducting means; means on the rotatable control member for causing a signal to be conducted to the remotely located indicator if the amount of liquid produced is outside of the predetermined limits; and means for automatically restting the system.

4. An automatic remote indicating system in accordance with claim 3 wherein the signal conducting means is an electrical current conducting system, the conduction control member is a first electric switch in the current conducting system, and the means on the rotatable control member for causing a signal to be conducted to the remotely located indicator is at least one contact for opening a second electric switch in series with said first electric switch if the amount of liquid produced is not outside of the predetermined limits.

References Cited in the file of this patent

UNITED STATES PATENTS

| | | |
|---|---|---|
| 975,072 | Rious | Nov. 8, 1910 |
| 2,545,928 | Martin et al. | Mar. 20, 1951 |